United States Patent
Brown

(10) Patent No.: US 8,414,195 B2
(45) Date of Patent: Apr. 9, 2013

(54) THRUST BEARING ASSEMBLY

(75) Inventor: James Kevin Brown, Rock Hill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 353 days.

(21) Appl. No.: 12/888,464

(22) Filed: Sep. 23, 2010

(65) Prior Publication Data

US 2012/0076451 A1   Mar. 29, 2012

(51) Int. Cl.
F16C 19/30 (2006.01)
F16C 33/58 (2006.01)
F16C 43/04 (2006.01)

(52) U.S. Cl. .................. 384/618; 384/620; 384/622

(58) Field of Classification Search ............ None
See application file for complete search history.

(56) References Cited

U.S. PATENT DOCUMENTS

| | | | | |
|---|---|---|---|---|
| 2,997,349 A * | 8/1961 | Pitner | ................. | 384/621 |
| 4,174,138 A * | 11/1979 | Johnston | ................. | 384/623 |
| 4,310,205 A * | 1/1982 | Condon et al. | ................. | 384/620 |
| 4,883,374 A * | 11/1989 | Rhoads et al. | ................. | 384/618 |
| 4,907,899 A * | 3/1990 | Rhoads | ................. | 384/620 |
| 4,981,373 A * | 1/1991 | Bando | ................. | 384/620 |
| 5,474,390 A * | 12/1995 | Rhoads | ................. | 384/623 |
| 5,967,674 A * | 10/1999 | Reubelt et al. | ................. | 384/620 |
| 6,830,381 B2 * | 12/2004 | Schwab et al. | ................. | 384/620 |

* cited by examiner

Primary Examiner — Phillip A Johnson
(74) Attorney, Agent, or Firm — Volpe and Koenig, P.C.

(57) ABSTRACT

A thrust bearing assembly having a plurality of rollers positioned in a cage is provided. A first race washer is positioned on a first axial side of the rollers and the cage, with the first race washer including a first axially extending flange axially overlapping the cage and the rollers, and having at least one protrusion extending in a direction away from the cage. A first retention band including a first axially extending band and a first retaining flange that extends radially from the first axially extending band is provided. The first retention band has at least one recess or opening and is complementary in size to the first race washer flange and engagable thereon. Engagement is accomplished via the at least one protrusion on the first axially extending flange engaging the at least one recess or opening in the first retention band. The first retaining flange has a width that is sized to overlap a portion of the cage on a second axial side. A second race washer and second retention band can be provided for a fully encapsulated thrust bearing assembly.

12 Claims, 2 Drawing Sheets

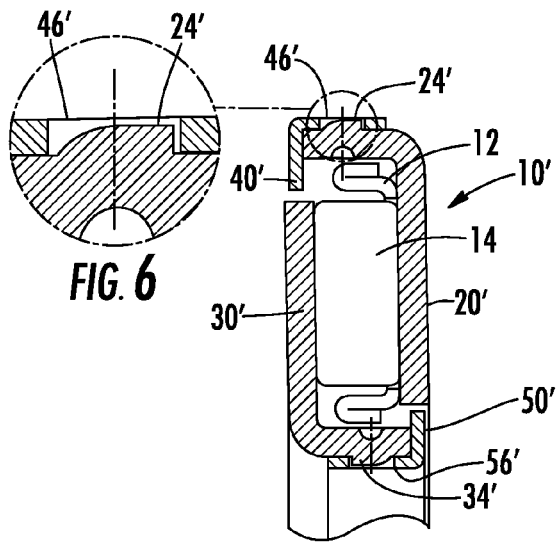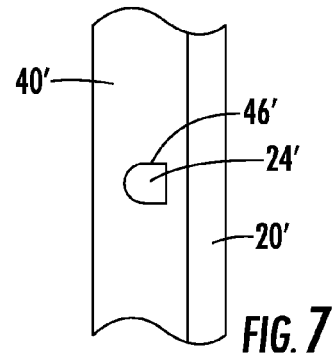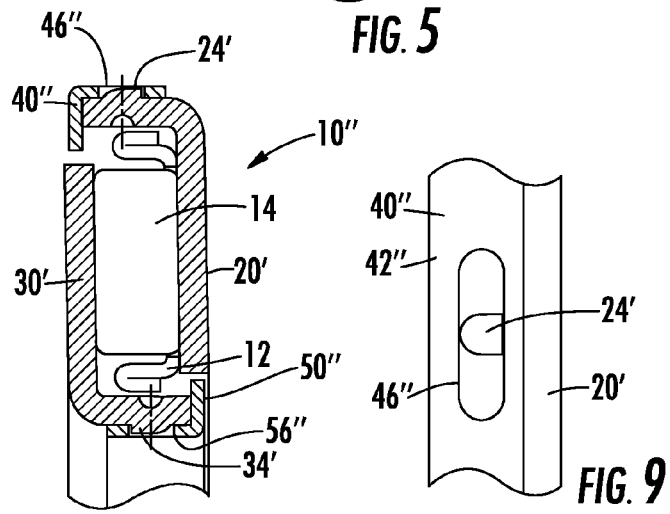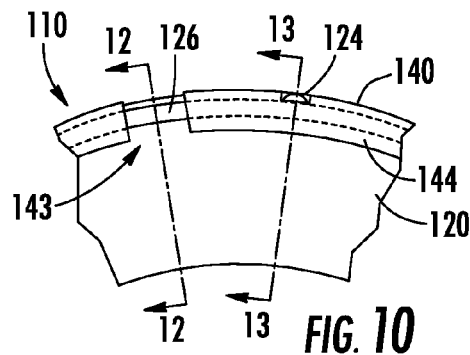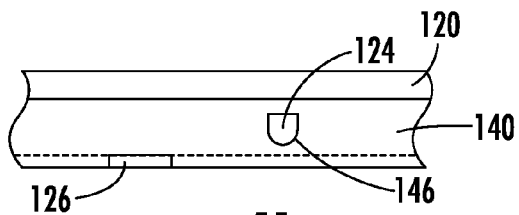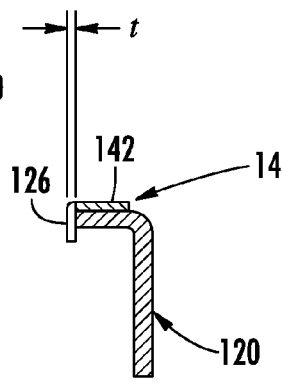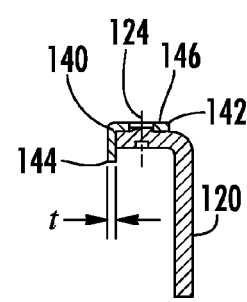

THRUST BEARING ASSEMBLY

BACKGROUND

The present invention is directed to a thrust bearing assembly, more particular to a roller axial thrust bearing assembly.

Axial roller thrust bearing assemblies that are assembled are sometimes referred to encapsulated thrust bearings as one or both race washers include retention tabs or 360° flange curls in order to hold the race washers to the cage-roller assembly. Unfortunately, with the known encapsulated thrust bearings, the retention tabs or 360° flange curls can sometimes disassemble during shipping or when the thrust bearing assemblies are placed into feeder bowls for assembly in various other larger assemblies, such as automatic transmissions. Increasing the interference between the cage and the retention feature is not always feasible because the cages are usually assembled after the retention feature is in place, and more interference would damage the cage during assembly. Bearing disassembly is also more likely to occur when additional clearance is needed between the cage and washers, such as in a torque convertor application. One known solution to this problem to keep the cage-roller assembly encapsulated by the race flanges is to flange additional retention bands onto the race washers after assembly with the cage-roller assembly. However, this requires specialized flanging equipment, resulting in additional manufacturing time and cost.

SUMMARY

Briefly stated, a thrust bearing assembly having a plurality of rollers positioned in a cage is provided. A first race washer is positioned on a first axial side of the rollers and the cage, with the first race washer including a first axially extending flange axially overlapping the cage and the rollers, and having at least one protrusion extending in a direction away from the cage. A first retention band including a first axially extending band and a first retaining flange that extends radially from the first axially extending band is provided. The first retention band has at least one recess or opening and is complementary in size to the first race washer flange and engagable thereon. Engagement is accomplished via the at least one protrusion on the first axially extending flange engaging the at least one recess or opening in the first retention band. The first retaining flange has a width that is sized to overlap a portion of the cage on a second axial side.

In another aspect, a second race washer is located on a second axial side of the rollers and the cage, with the second race washer including a second axially extending flange overlapping the cage and the rollers and having at least one protrusion directed away from the cage. The second axial extending flange is on a radially opposite side of the cage from the first axial extending flange. A second retention band including a second axially extending band and a second retaining flange that extends radially from the second axially extending band is also provided. The second retention band has at least one recess or opening and is complementary in size to the second race washer flange and engageable thereof. The at least one protrusion of the second race washer engages the at least one recess or opening in the second retention band in order to retain the retention band on the second race washer. The second retaining flange has a width that is sized to overlap a portion of the cage on the first axial side on a radial opposite side of the cage from the first retaining flange.

Additional aspects of the invention include providing a plurality of the protrusions and recesses or openings for engaging the retention bands to the race washers. One improvement provides that the protrusions are ramped protrusions adapted to allow a reduced force for installation of the retention bands on the race washers. Another improvement provides that the protrusion is D-shaped and the at least one recess or opening in the first retention band has a complementary shape. Additionally, in order to ease alignment requirements, it is also possible to provide that the at least one recess or opening in the retention band or bands are elongated in a peripheral direction. Alternatively or in addition, it is possible to provide an alignment tab extending axially from a free end of one or both axial flanges and provide a corresponding slot in one or both of the radial retention flanges of the retention bands. The alignment tab and slot provide a keying feature for alignment of the protrusions on the race washers and the recesses or openings on the retention bands.

Additional advantages and aspects of the invention are explained in detail below and can be implemented individually or in combinations.

BRIEF DESCRIPTION OF THE DRAWINGS

The foregoing summary and the following detailed description will be better understood when read in conjunction with the appended drawings, which illustrate a preferred embodiment of the invention. In the drawings:

FIG. 5 is a cross-sectional view similar to FIG. 2 of another embodiment of the thrust bearing assembly according to the invention.

FIG. 6 is an enlarged view of a portion of FIG. 5.

FIG. 7 is a top view taken from FIG. 5 showing the engagement of the protrusion in the recess.

FIG. 8 is a cross-sectional view similar to FIG. 5 of another embodiment of the invention in which the recess or opening in the retention band is elongated in the peripheral direction.

FIG. 9 is a top view taken from FIG. 8 of the protrusion engaged in the recess

FIG. 10 is a partial view showing one face of another embodiment of a thrust bearing assembly.

FIG. 11 is a top view of the thrust bearing assembly of FIG. 10.

FIG. 12 is a cross-sectional view taken along line 12-12 in FIG. 10.

FIG. 13 is a cross-sectional view taken along line 13-13 in FIG. 10.

DETAILED DESCRIPTION OF THE PREFERRED EMBODIMENTS

Figure 1:
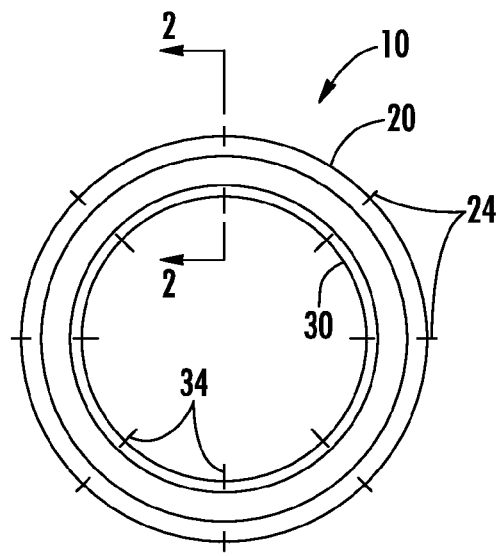
FIG. 1 is a front view of a thrust bearing assembly according to a first embodiment of the invention.

Certain terminology is used in the following description for convenience only and is not limiting. The words "radially" and "axially" designate directions in reference to the longitudinal axis extending through the bearing assembly according to the invention. The words "inwardly" and "outwardly" refer to the directions toward and away from the parts referenced in the drawings. A reference to a list of items that are cited as "at least one of a, b or c" (where a, b and c represent the items being listed) means any single one of the items a, b or c, or combinations thereof. The terms "needle" and "roller"

are used interchangeably. The terminology includes the words specifically noted above, derivatives thereof and words of similar import.

Figure 2:
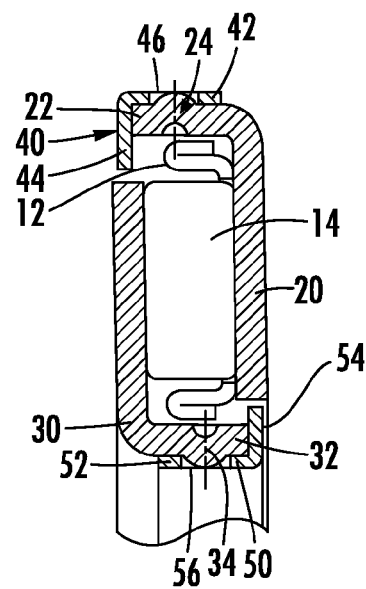
FIG. 2 is a cross-sectional view taken along lines 2-2 in FIG. 1.
Figure 3:
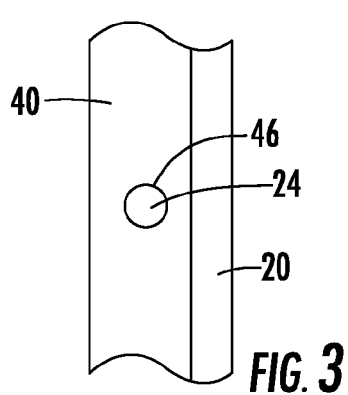
FIG. 3 is a top view taken from the view of the first embodiment of the thrust bearing assembly shown in FIG. 2.

Referring to FIGS. 1-3, a thrust bearing assembly 10 in accordance with the first embodiment of the present invention is shown. The thrust bearing assembly 10 includes a cage 12 and needles or rollers 14 which are shown in detail in FIG. 2. A first race washer 20 is provided which includes an axial flange 22. The first race washer is positioned on the first axial side of the rollers 14 and cage 12. The first axially extending flange 22 axially overlaps the cage 12 and the rollers 14 and has at least one protrusion 24 that extends in the direction away from the cage 12. As shown in FIG. 1, preferably a plurality of protrusions are provided at positions spaced about the periphery of the flange 22. While eight protrusions are shown in FIG. 1, this number can be varied and more or less protrusions can be provided.

A first retention band 40 which includes a first axial extending band 42 and a first retaining flange 44 that extends radially from the first axially extending band 42 is engaged to the first race washer 20. The first retention band 40 has at least one recess or opening 46 and the at least one protrusion 24 engages the at least one recess or opening 46 when the first retention band 40 is engaged with the first race washer 20. The first retaining flange 44 has a width W that is sized to overlap a portion of the cage 12 on a second axial side of the thrust washer assembly 10.

Referring to FIG. 3, in the first embodiment of the thrust bearing assembly, the protrusion 24 is dimple-shaped and recess or opening 46 is a circular opening that is punched through the axial band 42. Those skilled in the art will understand that this could also be provided as a dimpled recess 46 and not a through opening as illustrated. For a single race-washer encapsulated thrust bearing assembly, those skilled in the art will recognize that this is all that is required.

Still with reference to FIGS. 1-3, in the first embodiment of the invention a second race washer 30 is located on a second axial side of the rollers 14 and the cage 12. The second race washer 30 includes a second axially extending flange 32 overlapping the cage 12 and the rollers 14 and having at least one protrusion 34 that is directed away from the cage 12. The second axially extending flange 32 is on a radially opposite side of the cage 12 from the first axially extending flange 22 of the first race washer 20. A second retention band 50 which includes a second axially extending band 52 and a second retaining flange 54 that extends radially from the second axially extending band 52 is provided. The second retention band 50 has at least one recess or opening 56 and is complementary in size to the second race flange washer 30 and engageable thereon. In order to engage the second retention band 50 in position, the at least one protrusion 34 of the second race washer 30 engages with the at least one recess or opening 56 in the second retention band 50. The second retaining flange has a width that is sized to overlap a portion of the cage 12 on the first axial side on a radially opposite side of the cage 12 from the first retaining flange 44. In the embodiment shown, the first axial flange 22 of the first race washer is located on the radial outer side of the cage 12 and rollers 14 while the second axial flange 32 of the second race washer is located radially inwardly of the cage 12 and rollers 14. This provides an assembly in which the cage 12 and rollers 14 are fully encapsulated between the race flanges 20 and 30.

Figure 4:
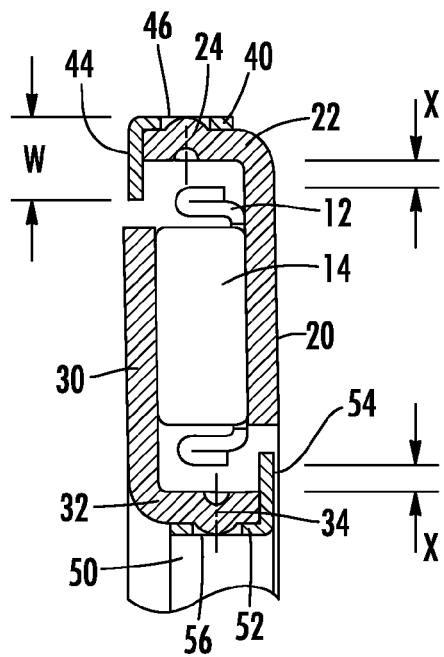
FIG. 4 is a second embodiment of the thrust bearing assembly showing an increased spacing between the cage and the axial flanges of the race washers.

Referring to FIG. 4, an alternate embodiment to that shown in FIG. 2 is illustrated. Here, the width W of the retaining flanges 44, 54 of the first and second retention bands 40, 50, respectively is shown. In this case, the width W is greater than in FIG. 2 based on the increased distance X between the cage 12 and the first axial flange 22 as well as the second axial flange 32. Based on the use of the separate retention bands 40, 50, this increased distance X is easily accommodated by changing the dimension W of the retaining flanges 44, 54.

Referring to FIGS. 5-7, a second embodiment of the thrust bearing assembly 10' is shown. The second embodiment of the thrust bearing assembly 10' is the same as the first embodiment of the thrust bearing assembly 10 with similar elements being identified with a prime. For example, the first race washer 20' of the second embodiment of the thrust washer assembly 10' is similar to the first race washer 20 of the first embodiment of the thrust bearing assembly 10 except for the differences described below.

In the second embodiment of the thrust bearing assembly 10', the protrusion 24', 34' on the first and second race washers 20', 30' are D-shaped and the recesses or openings 46', 56' in the first and second retention bands 40', 50' have a complementary D-shape. Additionally, as shown in detail in FIG. 6, the protrusions 24', 34' are ramped to allow a reduced force for installation of respective ones of the first and/or second retention bands 40', 50' onto the first and second race washers 20', 30'. Additionally, opposite of the ramped side, a square side is provided that helps to retain the retention bands 40', 50' on the race washers 20', 30'. While a D-shaped configuration is shown along with a curved ramp surface, those of ordinary skill in the art will recognize that these shapes can be varied and that the ramp could be, for example, a wedge-shaped ramp.

Referring to FIGS. 8 and 9, a third embodiment of the thrust bearing assembly 10" is shown. The third embodiment of the thrust bearing assembly 10" is similar to the second embodiment 10'. The differences are noted in detail below.

In the third embodiment of the thrust bearing assembly 10", as shown in FIG. 9 in detail, the recess or opening 46" in the first retention band 40" is elongated in the peripheral direction. This allows for less perfect alignment of the protrusions 24' with the openings or recesses 46" during assembly of the retention band 40" onto the first race washer 20'. The second retention band 50" preferably also includes a similarly elongated retaining opening 56" that is elongated in the peripheral direction similar to the retaining opening 46" shown in FIG. 9. This arrangement allows for easier assembly without the requirement for perfect alignment of the openings 46", 56" and protrusions 24', 34'.

Referring to FIGS. 10-13, a fourth embodiment of the thrust bearing assembly 110 is partially shown. The fourth embodiment of the thrust bearing assembly 110 is similar to the first embodiment of the thrust bearing assembly 10 shown in FIGS. 1-3 and includes the cage 12 and rollers 14 which are not illustrated for clarity in FIGS. 10-13. The thrust bearing assembly 110 is only illustrated here with the first race washer 120 which has an axially extending flange that overlaps the cage 12 and rollers 14 (not shown) in the axial direction. An alignment tab 126 extends axially from the end of the axial flange 122 as shown in FIG. 10. The alignment tab 126 has a thickness T as indicated in FIG. 12. In order to encapsulate and retain the cage 12 and rollers 14 in position, the first retention band 140 includes an axial band 142 having a radially extending retention flange 144. Recesses or openings 146 are provided in the axial band 142 in the same manner as discussed above in connection with the first embodiment. Additionally, a slot 143 is formed in the retention flange with the slot 143 being complementary to the alignment tab 126 on the first axial flange 122. As shown in FIG. 13, the thickness T of the retention flange 144 is preferably about the same as the thickness T of the alignment tab 126. This arrangement allows for an easier alignment of the protrusions 124 and the openings or recesses 146 during installation of the retention band 140 onto the first race washer 120. Although not illustrated, the second race washer could also be provided with a similar arrangement of an alignment tab located on an end of the axial flange and the second retention band could be similarly provided with a complementary slot to provide an alignment feature for both race washers for assemblies in which the cage 12 and rollers 14 are encapsulated between two race washers.

Preferably, the rollers 14 and race washers are made of tool or bearing steel that is hardened to the appropriate hardness to provide the desired wear characteristics. The retention bands can be made of a more ductile material and are preferably deep drawn parts made from a more ductile steel to allow for easier installation through elastic deformation of the retention bands as they are installed. Alternatively, other metals or polymeric materials could be used for the retention bands, if desired.

By using the invention, a low cost solution for maintaining thrust bearing assemblies in an assembled state during shipping and in automated handling systems for assembling larger assemblies is provided. While the preferred embodiments of the invention has been described in detail, the invention is not limited to the specific preferred embodiments provided and the scope of protection is defined by the appended claims.

What is claimed is:

1. A thrust bearing assembly comprising:
    a plurality of rollers positioned in a cage;
    a first race washer positioned on a first axial side of the rollers and the cage, the first race washer including a first axially extending flange axially overlapping the cage and the rollers and having at least one protrusion directed away from the cage; and
    a first retention band including a first axially extending band and a first retaining flange that extends radially from the first axially extending band, the first retention band having at least one recess or opening and being complementary in size to the first race washer flange and engagable thereon, with the at least one protrusion engaging the at least one recess or opening, and the first retaining flange having a width that is sized to overlap a portion of the cage on a second axial side.

2. The thrust bearing assembly of claim 1, wherein the protrusion is a ramped protrusion adapted to allow a reduced force for installation of the first retention band to the first race washer, and has a square shape, opposite a ramped side, that assists in retaining the first retention band on the first race washer.

3. The thrust bearing assembly of claim 1, wherein the protrusion is D-shaped and the at least one recess or opening in the first retention band has a complementary shape.

4. The thrust bearing assembly of claim 1, wherein the protrusion is D-shaped and the at least one recess or opening in the first retention band is elongated in a peripheral direction.

5. The thrust bearing assembly of claim 1, wherein an alignment tab extends axially from a free axial end of the first axial flange, and a slot is located in the first radial retention flange, the alignment tab and the slot providing a keying feature for alignment of the at least one protrusion on the first race washer and the at least one recess or opening on the first retention band.

6. The thrust bearing assembly according to claim 1, further comprising a second race washer located on a second axial side of the rollers and the cage, the second race washer including a second axially extending flange overlapping the cage and the rollers and having at least one protrusion directed away from the cage, the second axially extending flange being on a radially opposite side of the cage from the first axially extending flange, and a second retention band including a second axially extending band and a second retaining flange that extends radially from the second axially extending band, the second retention band having at least one recess or opening and being complementary in size to the second race washer flange and engagable thereon, with the at least one protrusion of the second race washer engaging the at least one recess or opening in the second retention band, and the second retaining flange having a width that is sized to overlap a portion of the cage on the first axial side on a radially opposite side of the cage from the first retaining flange.

7. The thrust bearing assembly of claim 6, wherein the protrusions on the first and second race washers are ramped protrusions adapted to allow a reduced force for installation of respective ones of the first and second retention bands to the first and second race washers.

8. The thrust bearing assembly of claim 6, wherein the protrusions on the first and second race washers are D-shaped and the recesses or openings in the first and second retention bands have a complementary shape.

9. The thrust bearing assembly of claim 6, wherein the protrusions on the first and second race washers are D-shaped and the recesses or openings in the first and second retention bands are elongated in a peripheral direction.

10. The thrust bearing assembly of claim 6, wherein alignment tabs extend axially from free axial ends of the first and second axial flanges, and slots are located in the first and second radial retention flanges, respectively, the alignment tabs and the slots providing keying features for alignment of the protrusions on the first and second race washers and the recesses or openings on the first and second retention bands.

11. The thrust bearing of claim 6, wherein there are at least two of the recesses or openings in each of the first and second retention bands, and there are at least two of the protrusions located on each of the first and second axial flanges in complementary positions to the recesses or openings.

12. The thrust bearing assembly of claim 1, wherein the first retaining flange has a width sufficient to retain the cage and the rollers in the thrust washer assembly regardless of a distance between the cage and the first retaining flange.

* * * * *